US007830996B2

(12) United States Patent
Ryou

(10) Patent No.: US 7,830,996 B2
(45) Date of Patent: Nov. 9, 2010

(54) DISPLAY APPARATUS AND CONTROL METHOD THEREOF

(75) Inventor: Kye-won Ryou, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1106 days.

(21) Appl. No.: 11/485,472

(22) Filed: Jul. 13, 2006

(65) Prior Publication Data

US 2007/0030261 A1 Feb. 8, 2007

(30) Foreign Application Priority Data

Aug. 5, 2005 (KR) ...................... 10-2005-0071936

(51) Int. Cl.
*H04B 7/10* (2006.01)
*H04L 1/02* (2006.01)

(52) U.S. Cl. ....................... 375/347; 375/318; 375/330; 327/65

(58) Field of Classification Search ................. 375/318, 375/330, 347; 327/65; 345/204
See application file for complete search history.

(56) References Cited

U.S. PATENT DOCUMENTS 5,243,623 A * 9/1993 Murdock .................... 375/220
7,088,789 B2 * 8/2006 Cheng et al. ................ 375/316
2001/0028748 A1 * 10/2001 Sato et al. .................... 382/239
2001/0052815 A1 * 12/2001 Llewellyn ..................... 330/69
2003/0001687 A1 * 1/2003 Wright et al. ................. 333/26
2003/0145258 A1 * 7/2003 Warner et al. ............... 714/704
2003/0214426 A1 * 11/2003 Sechi et al. ................. 341/155
2004/0207586 A1 * 10/2004 Tsai et al. ...................... 345/87

FOREIGN PATENT DOCUMENTS

KR 20-0147427 3/1999
KR 1999-0058098 7/1999
KR 2000-0061270 10/2000
KR 2002-59976 7/2002

OTHER PUBLICATIONS

KR Office Action dated Oct. 30, 2006 issued in KR 2005-71936.

* cited by examiner

*Primary Examiner*—Curtis B Odom
(74) *Attorney, Agent, or Firm*—Stanzione & Kim, LLP

(57) ABSTRACT

A display apparatus which processes an input image signal to display it thereon having a connector which is connected with an external source, a differential signal receiver which processes a differential signal from the external source, and a differential signal controller which generates a predetermined temporary differential signal using a single ended signal transmitted from the external source and outputs it to the differential signal receiver. Thus, the display apparatus generates a temporary differential signal corresponding to an input single ended signal to process it as a differential signal, and a control method thereof.

19 Claims, 3 Drawing Sheets

DISPLAY APPARATUS AND CONTROL METHOD THEREOF

CROSS-REFERENCE TO RELATED APPLICATIONS

This application claims the priority of Korean Patent Application No. 2005-0071936, filed on Aug. 5, 2005, in the Korean Intellectual Property Office, the disclosure of which is incorporated herein in its entirety by reference.

BACKGROUND OF THE INVENTION

1. Field of the Invention

The present general inventive concept relates to a display apparatus and a control method thereof, and more particularly, to a display apparatus which receives and processes a differential signal and a control method thereof.

2. Description of the Related Art

Generally, a display apparatus such as a monitor processes an image signal transmitted from a signal source such as a PC, to display it thereon.

In the conventional display apparatus, the image signal transmitted from the signal source to the display apparatus may be classified based on a user environment having a distance from the signal source to the display. The image signal transmitted from the signal source such as the PC can be classified as a single ended signal transmitted in a short-distance environment where the display apparatus is close to the signal source, and a differential signal transmitted in a long-distance environment where the display apparatus is far from the signal source. In the long-distance environment, the differential signal is more efficient to prevent signal losses. A single ended transmission line is used in the short-distance environment, and a differential signal transmission line is used in the long-distance environment.

As the signal source such as the PC internally processes signals into the single ended signal, the single ended signal processed by the signal source should be converted into the differential signal and the differential signal transmitted from the display apparatus should be converted into the single ended signal, to transmit signals as the differential signal type in the long-distance environment. At this time, a signal process module which converts the differential signal into the single ended signal has an equalization circuit therein to compensate for signal frequency losses.

When the differential signal transmission line is used, the signal source such as the PC is required to have a differential signal conversion module therein. However, it is not cost effective to have the differential signal conversion module if the user environment does not require a long cable.

Also, quality pictures may be realized by using the single ended transmission line within the short distance environment instead of the differential signal transmission line, and by using the equalization circuit which compensates for the signal frequency losses according to the distance from the image signal source to the display.

SUMMARY OF THE INVENTION

The present general inventive concept provides a display apparatus which generates a temporary differential signal corresponding to an input single ended signal to process the single ended signal as a differential signal, and a control method thereof.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a display apparatus which processes an input image signal to display the input image signal thereon, comprising a connector to connect with an external source, a differential signal receiver which processes a differential signal from the external source, and a differential signal controller which generates a predetermined temporary differential signal using a single ended signal transmitted from the external source and outputs the predetermined temporary differential signal to the differential signal receiver.

According to another embodiment of the present general inventive concept, the differential signal receiver can comprise (+) signal input lines and a (−) signal input lines to receive the differential signal, and the differential signal controller comprises a temporary differential signal generator which generates the predetermined temporary differential signal paired with the single ended signal, and a temporary differential signal controller which controls the predetermined temporary differential signal generated by the temporary differential signal generator to be output to one of the (+) signal input lines and the (−) signal input lines, to which the single ended signal is not input.

According to another embodiment of the present general inventive concept, the predetermined temporary differential signal can comprise a ground signal.

According to another embodiment of the present general inventive concept, the connector can comprise a detection pin which detects a signal input from the external source and outputs a detection signal, and the temporary differential signal controller determines whether the single ended signal is input or the differential signal is input based on the detection signal output from the detection pin.

According to another embodiment of the present general inventive concept, the temporary differential signal controller can control the single ended signal to be input to the (+) signal input lines and can control the (−) signal input lines to be connected to the ground signal if the temporary differential signal controller determines that the single ended signal is input, based on the detection signal output from the detection pin.

According to another embodiment of the present general inventive concept, the temporary differential signal controller can control the input differential signal to supply a positive portion (+) of the differential signal to the (+) signal input lines and to supply a negative (−) portion of the differential signal to the (−) signal input lines if the temporary differential signal controller determines that the differential signal is input, based on the detection signal output from the detection pin.

According to another embodiment of the present general inventive concept, the temporary differential signal controller can comprise a switch to supply one of the ground signal and the negative (−) portion of the differential signal to the (−) signal input lines based on the detection signal output from the detection pin.

The foregoing and/or other aspects and utilities of the present general inventive concept may also be achieved by providing a method of controlling a display apparatus which has a connector connected to an external source and a differential signal receiver to process a differential signal from the external source, the method comprising determining whether a signal transmitted from the external source is a single ended signal or a differential signal; and generating a predetermined temporary differential signal by using the single ended signal to output the predetermined temporary differential signal to the differential signal receiver if the transmitted signal is the single ended signal.

According to another embodiment of the present general inventive concept, the generating and outputting the predetermined temporary differential signal can comprise generating the predetermined temporary differential signal paired with the single ended signal and outputting the predetermined temporary differential signal to one of the (+) signal input lines and the (−) signal input lines of the differential signal receiver, to which the single ended signal is not input.

According to another embodiment of the present general inventive concept, the determining whether the signal transmitted from the external source is the single ended signal or differential signal can comprise determining whether the single ended signal is input based on a detection signal output from the connector, and the generating and outputting the predetermined temporary differential signal comprises allowing the single ended signal to be input to the (+) signal input lines and allowing the (−) signal input lines to be connected to a ground if it is determined that the single ended signal is input.

According to another embodiment of the present general inventive concept, the method can comprise transmitting the input differential signal to the (+) signal input line and the (−) signal input line if it is determined that the differential signal is input.

The foregoing and/or other aspects and utilities of the present general inventive concept may also be achieved by providing a display apparatus comprising a connector to connect with an external source through a transmission cable to receive either a single ended signal or a differential signal from the external source, and a differential signal controller to receive the signal from the connector, and to generate and output the signal received if the signal is the differential signal or to generate and output a temporary differential signal together with the single ended signal if the signal received is the single ended signal.

The foregoing and/or other aspects and utilities of the present general inventive concept may also be achieved by providing a differential signal controller, comprising a temporary differential signal generator to generate a predetermined temporary differential signal when a signal input thereto is a single ended signal, and a temporary differential signal controller to output the temporary differential signal if generated otherwise to output the input signal.

The foregoing and/or other aspects and utilities of the present general inventive concept may also be achieved by providing a method of processing an input image signal, comprising determining the type of input signal input to a display apparatus, generating a temporary alternative signal that can be processed by a processing unit of the display apparatus if the input signal is determined to be a predetermined type of input signal, and processing and outputting the temporary alternative signal if the input signal is determined to be the predetermined type of input signal, otherwise outputting the input signal.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
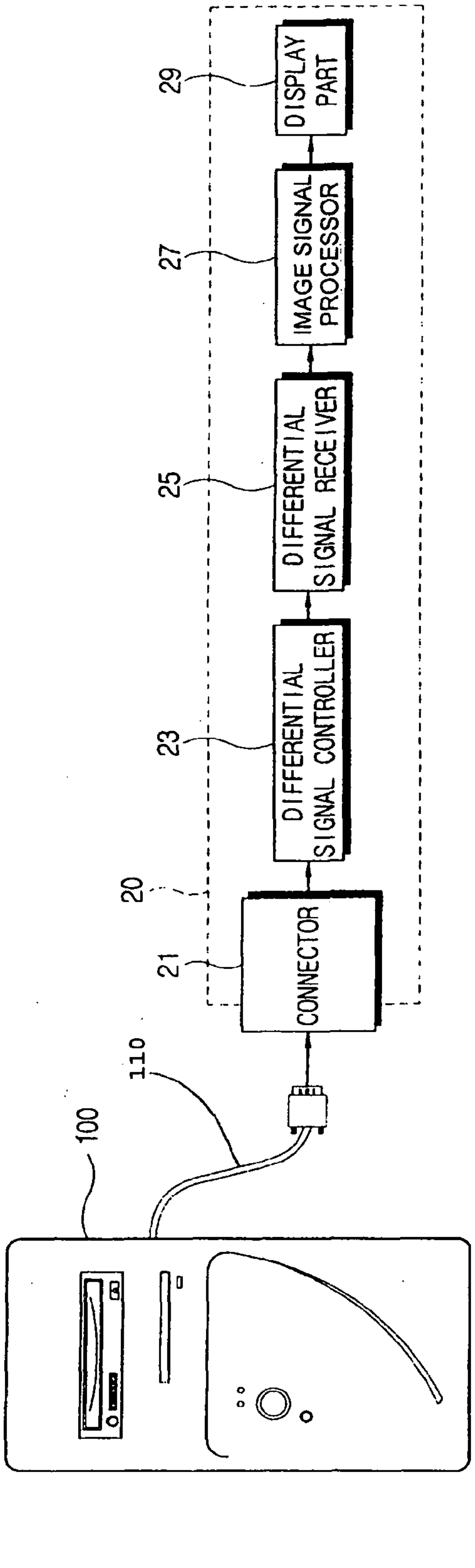
FIG. 1 is a control block diagram illustrating a display apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 illustrates a control block diagram of a display apparatus 20 according to an embodiment of the present general inventive concept.

Referring to FIG. 1, the display apparatus 20 according to the present embodiment comprises a connector 21, a differential signal controller 23, a differential signal receiver 25, an image signal processor 27 and a display part 29.

The connector 21 is connected to a transmission cable 110 which transmits a signal that is output from a PC 100 as an external source. The transmitted signal may be a single ended signal or a differential signal. The transmission cable 110 may be a type of transmission cable including a single ended signal transmission cable or a differential signal transmission cable. The single ended signal transmission cable which transmits the single ended signal and a differential signal transmission cable which transmits the differential signal may be connected to the identical connector 21 as illustrated or to a different connector 21, respectively. In an embodiment having a plurality of connectors 21, a switch may be provided to connect an input signal line of the connector 21 receiving signals to an internal signal process module.

The connector 21 may further comprise a detection pin to detect the type of the transmission cable 110 connected to the connector 21. For example, if the connector 21 is provided as a D-Sub connector, a 10th pin may function as the detection pin. The detection pin may output a detection signal as a high signal when the connector 21 is connected to the single ended transmission cable 110, and the detection pin may output a detection signal as a low signal when the connector 21 is connected to the differential transmission cable 110. That is, the detection pin which outputs a detection signal according to the type of the transmission cable 110, may determine whether the input signal is the single ended signal or the differential signal.

The differential signal receiver 25 processes the differential signal received from the differential signal controller 23 (to be described later) through a signal input line of the differential signal receiver 25, and outputs an image signal to the image signal processor 27. The differential signal receiver 25 comprises a signal converter (not shown) which converts the differential signal into the single ended signal; and an equalization circuit (not shown) which compensates for signal frequency losses generated during a transmission process through the transmission cable 110. The equalization circuit (not shown) compensates for the frequency losses generated during the transmission process according to a preset register value.

The image signal output from the differential signal receiver 25 is displayed on the display part 29 after being processed by the image signal processor 27. The display part 29 may employ various display modules such as a digital light processing (DLP), a liquid crystal display (LCD), a plasma display panel (PDP), etc. The image signal processor 27 comprises an analog to digital (A/D) converter (not shown) which converts an analog signal into a digital signal; and a scaler (not shown) which converts the converted digital image signal according to a vertical frequency, resolution, and picture ratio of output standards of the display apparatus 29.

The differential signal controller 23 according to an embodiment of the present general inventive concept determines whether the signal input from the PC 100 as the external source is the single ended signal or the differential signal. If the input signal is the single ended signal, the differential signal controller 23 generates a temporary differential signal corresponding to the single ended signal and outputs the temporary differential signal to the differential signal receiver 25. If the input signal is the differential signal, the differential signal controller 23 outputs the input differential signal to the differential signal receiver 25. The differential signal controller 23 may be a controller such as, for example, a microcomputer or as a simple switching control circuit.

Hereinafter, the differential signal controller 23 according to an embodiment of the present general inventive concept will be described with reference to FIG. 2.

Figure 2:
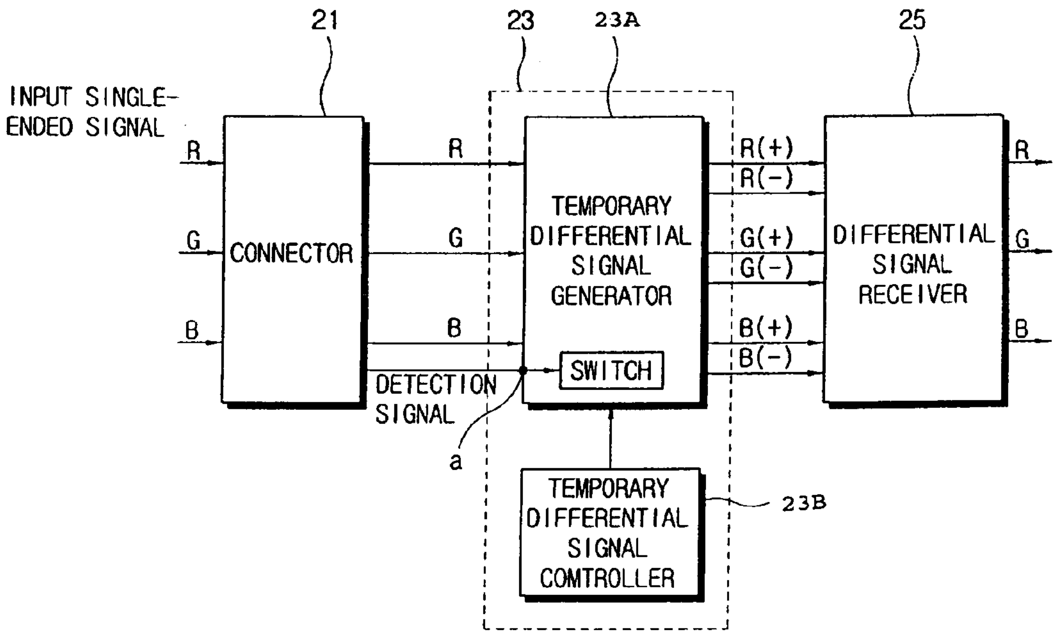
FIG. 2 is a detailed control block diagram illustrating a differential signal controller of FIG. 1 according to an embodiment of the present general inventive concept.

As illustrated in FIG. 2, the differential signal controller 23 can comprise a temporary differential signal generator 23A which generates the temporary differential signal to be paired with the input single ended signal; and a temporary differential signal controller 23B to control the temporary differential signal of the temporary differential signal generator 23A to be output to either the negative set (−) or the positive set (+) of signal input lines R(+), R(−), G(+), G(−), B(+) and B(−) of the differential signal receiver 25, to which the single ended signal is not output thereto. Thus, the temporary differential signal output by the differential signal controller 23 is paired with the input single ended signal.

Single ended image signals R, G and B are input, as illustrated in FIG. 2, to describe the input single ended signal, as an embodiment of the present general inventive concept. If the differential signal is input, the temporary differential signal controller 23B controls the input differential signals R(+), R(−), G(+), G(−), B(+) and B(−) to be output to the respective R(+), R(−), G(+), G(−), B(+) and B(−) signal input lines of the differential signal receiver 25.

The temporary differential signal generator 23A generates the temporary differential signal paired with the single ended signal. The temporary differential signal may comprise a ground signal. That is, the temporary differential signal generator 23A may comprise a ground terminal. The ground signal generated by the temporary differential signal generator 23A is included in the temporary differential signal, together with the input single ended signals R, G and B.

If the single ended signal is input according to the detection signal output from the detection pin of the connector 21, the temporary differential signal controller 23B controls the single ended signal to be input to the R(+), G(+) and B(+) signal input lines, respectively, and controls the ground signal as the temporary differential signal generated by the temporary differential signal generator 23A to be input to the remaining R(−), G(−) and B(−) signal input lines. That is, the R(−), G(−) and B(−) signal input lines can be connected to a ground of the differential signal controller 23 or to the differential signal provided by the differential signal controller 23 according to whether the input signal is the single ended signal or the differential signal.

In an embodiment of the present general inventive concept, the temporary differential signal controller 23B may comprise a switch to allow either the temporary differential signal of the temporary differential signal generator 23A or the input differential signal to be output to the differential signal receiver 25 according to the detection signal output from the detection pin of the connector 21.

For example, if the detection pin outputs the high signal in a state that the connector 21 is connected to the single ended signal cable, the switch is switched on to output the temporary differential signal generated by the temporary differential signal generator 23A to the differential signal receiver 25 through the R(−), G(−) and B(−) signal input lines connected to the differential signal receiver 25. Additionally, the single ended signal of the single ended signal cable is output to the differential signal receiver 25 through the R(+), G(+) and B(+) signal input lines connected to the differential signal receiver 25. Alternatively, if the detection pin outputs the low signal, the switch is switched on to output the input negative portion (−) of the differential signal to the differential signal receiver 25 through the R(−), G(−) and B(−) signal input lines.

Then, even if the single ended signal is input, the differential signal receiver 25 can process the corresponding signal.

Figure 3:
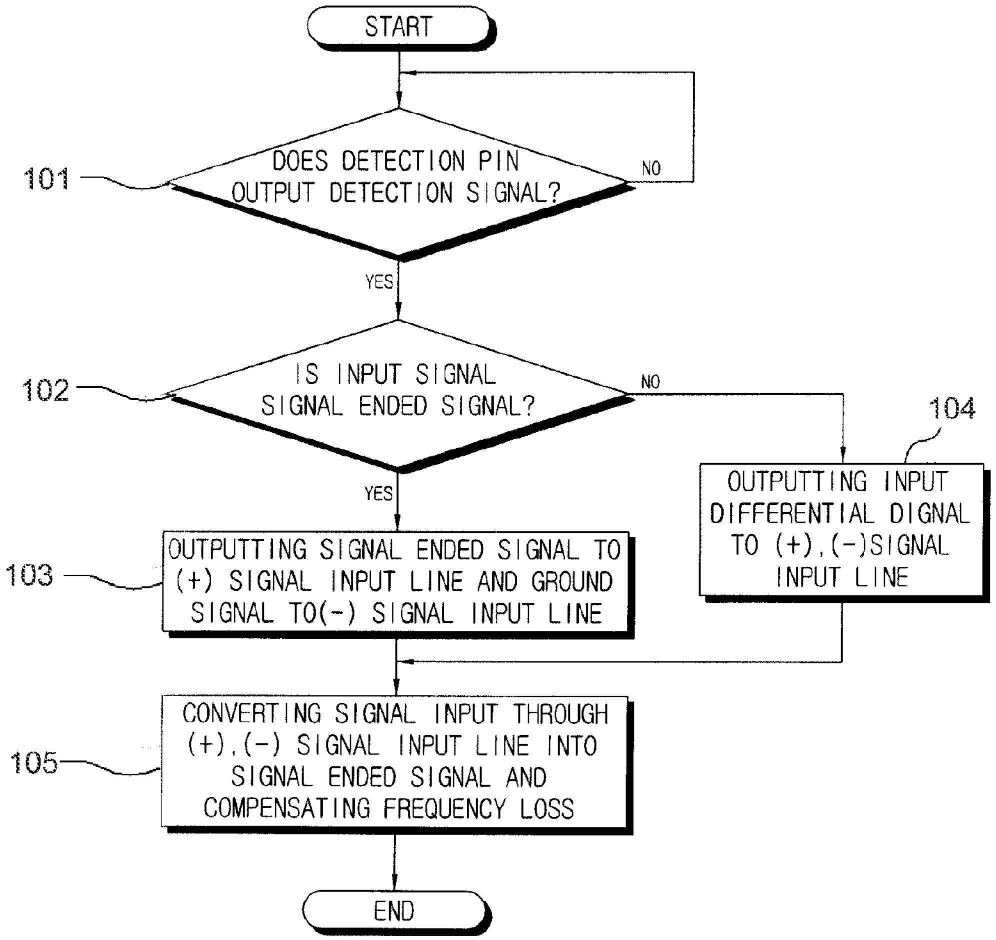
FIG. 3 is a control flowchart illustrating the display apparatus of FIG. 1 according to an embodiment of the present general inventive concept.

Hereinafter, a method of controlling the display apparatus 20 of the embodiments of FIGS. 1 and 2, according to an embodiment of the present general inventive concept, will be described with reference to FIG. 3.

When the detection pin of the connector 21 outputs a detection signal to inform as to whether the transmission cable 110 is connected, and if so, the type of transmission cable that is connected, at operation 101, the differential signal controller 23 determines whether the input signal is a single ended signal or a differential signal according to the output detection signal at operation 102.

If the detection pin outputs a high signal in an example where the D-Sub connector as a connector 21 is connected, the differential signal controller 23 determines that the single ended signal is input, and outputs the input single ended signal to the (+) signal input lines of the differential signal receiver 25 and outputs the temporary differential signals, i.e., a ground signal to the (−) signal input lines of the differential signal receiver 25 at operation 103.

If the detection pin outputs a low signal in an example where the D-Sub connector is not connected, the differential signal controller 23 determines that the differential signal is input to the display apparatus 20 and outputs the corresponding differential signals to the (+)/(−) signal input lines of the differential signal receiver 25 at operation 104.

The differential signal receiver 25 converts the input differential signal or the temporary differential signal paired with the input single ended signal into the single ended signal, and compensates for the frequency losses generated during the transmission process of the transmission cable 110 at operation 105. Thus, the differential signal reception process module can process the received single ended signal.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A display apparatus which processes an input image signal to display the input image signal thereon, comprising:

a connector to connect with an external source;

a differential signal receiver which processes a differential signal from the external source; and a differential signal controller which generates a predetermined temporary differential signal using a single ended signal transmitted from the external source and outputs the predetermined temporary differential signal to the differential signal receiver, wherein the differential signal receiver comprises (+) signal input lines and (−) signal input lines to receive the differential signal, and wherein the differential signal controller comprises a temporary differential signal generator which generates the predetermined temporary differential signal paired with the single ended signal, and a temporary differential signal controller which controls the predetermined temporary differential signal generated by the temporary differential signal generator to be output to one of the (+) signal input lines and the (−) signal input lines, to which the single ended signal is not input.

2. The display apparatus according to claim 1, wherein the predetermined temporary differential signal comprises a ground signal.

3. The display apparatus according to claim 1, wherein:

the connector comprises a detection pin which detects a signal input from the external source and outputs a detection signal, and the temporary differential signal controller determines whether the single ended signal is input or the differential signal is input based on the detection signal output from the detection pin.

4. The display apparatus according to claim 1, wherein the temporary differential signal controller controls the single ended signal to be input to the (+) signal input lines and controls the (−) signal input lines to be connected to the ground signal if the temporary differential signal controller determines that the single ended signal is input, based on the detection signal output from the detection pin.

5. The display apparatus according to claim 1, wherein the temporary differential signal controller controls the input differential signal to supply a positive portion (+) of the differential signal to the (+) signal input lines and to supply a negative (−) portion of the differential signal to the (−) signal input lines if the temporary differential signal controller determines that the differential signal is input, based on the detection signal output from the detection pin.

6. The display apparatus according to claim 1, wherein the temporary differential signal controller comprises a switch to supply one of the ground signal and the negative (−) portion of the differential signal to the (−) signal input lines based on the detection signal output from the detection pin.

7. A method of controlling a display apparatus which has a connector connected to an external source and a differential signal receiver to process a differential signal from the external source, the method comprising:

determining whether a signal transmitted from the external source is a single ended signal or a differential signal; and generating a predetermined temporary differential signal by using the single ended signal to output the predetermined temporary differential signal to the differential signal receiver if the transmitted signal is the single ended signal, wherein the generating and outputting the predetermined temporary differential signal comprises generating the predetermined temporary differential signal paired with the single ended signal and outputting the predetermined temporary differential signal to one of the (+) signal input lines and the (−) signal input lines of the differential signal receiver, to which the single ended signal is not input.

8. The method according to claim 7, wherein: the determining whether the signal transmitted from the external source is the single ended signal or differential signal comprises determining whether the single ended signal is input based on a detection signal output from the connector, and the generating and outputting the predetermined temporary differential signal comprises allowing the single ended signal to be input to the (+) signal input lines and allowing the (−) signal input lines to be connected to a ground if it is determined that the single ended signal is input.

9. The method according to claim 7, further comprising: transmitting the input differential signal to the (+) signal input line and the (−) signal input line if it is determined that the differential signal is input.

10. A display apparatus, comprising:

a connector to connect with an external source through a transmission cable to receive either a single ended signal or a differential signal from the external source; and a differential signal controller to receive the signal from the connector, and to output the received signal if the signal is the differential signal and to generate and output a temporary differential signal together with the single ended signal if the signal received is the single ended signal.

11. The display apparatus of claim 10, wherein the differential signal controller comprises:

a temporary differential signal generator to generate the temporary differential signal using the single ended signal;

a temporary differential signal controller to control the temporary differential signal generator to generate and output the temporary differential signal together with the single ended signal if the signal received is the single ended signal; and a switch to output the input differential signal when the input signal is the differential signal and to output the temporary differential signal when the input signal is the single ended signal.

12. The display apparatus of claim 10, further comprising:

a differential signal receiver to convert the input differential signal to an output single ended signal and to compensate for frequency losses during transmission of signals received from the external source.

13. The display apparatus of claim 12, further comprising an image signal processor to process the output single ended signal to be input to a display part.

14. The display apparatus of claim 10, wherein the connector further comprises a detection pin to detect a type of transmission cable and to output a detection signal based on the detection signal.

15. The display apparatus of claim 10, wherein the connector further comprises a plurality of connectors and a switch to connect one of the connectors receiving the input signal to the differential signal controller to provide the input signal thereto.

16. A differential signal controller, comprising:

a temporary differential signal generator to generate a predetermined temporary differential signal when a signal input thereto is a single ended signal; and a temporary differential signal controller to output the temporary differential signal if generated otherwise to output the input signal, wherein the temporary differential signal controller comprises a switch to output either the predetermined temporary differential signal or to output the input signal according to an input detection signal.

17. A method of processing an input image signal, comprising:

determining the type of input signal input to a display apparatus;

generating a temporary alternative signal that can be processed by a processing unit of the display apparatus if the input signal is determined to be a predetermined type of input signal; and processing and outputting the temporary alternative signal if the input signal is determined to be the predetermined type of input signal, otherwise outputting the input signal, wherein the processing and outputting the temporary alternative signal if the input signal is determined to be the predetermined type of input signal further comprises pairing the temporary alternative signal to the input signal.

18. The method of claim 17, wherein the predetermined type of input signal is a single ended signal.

19. The method of claim 17, wherein the predetermined type of input signal is a single ended signal.

* * * * *